(12) United States Patent
Eastman

(10) Patent No.: US 10,331,707 B2
(45) Date of Patent: *Jun. 25, 2019

(54) SYSTEM AND METHOD FOR DETERMINING THE OCCURRENCE OF ORGANIZED ATHLETIC EVENTS

(71) Applicant: Under Armour, Inc., Baltimore, MD (US)

(72) Inventor: Kyler Maxwell Eastman, Austin, TX (US)

(73) Assignee: Under Armour, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,750

(22) Filed: Jun. 14, 2018

(65) Prior Publication Data

US 2018/0293296 A1    Oct. 11, 2018

Related U.S. Application Data

(63) Continuation of application No. 14/796,196, filed on Jul. 10, 2015, now Pat. No. 10,068,004.

(51) Int. Cl.
| | |
|---|---|
| *A63B 24/00* | (2006.01) |
| *G06F 16/28* | (2019.01) |
| *G06Q 10/02* | (2012.01) |
| *G06Q 10/06* | (2012.01) |

(52) U.S. Cl.
CPC ........ *G06F 16/287* (2019.01); *A63B 24/0075* (2013.01); *A63B 24/0084* (2013.01); *A63B 24/0087* (2013.01); *G06Q 10/02* (2013.01); *G06Q 10/06* (2013.01); *A63B 2024/0025* (2013.01); *A63B 2024/0056* (2013.01); *A63B 2024/0071* (2013.01); *A63B 2024/0081* (2013.01)

(58) Field of Classification Search
CPC .. A63B 2220/10–14; A63B 2024/0025; A63B 2024/0056; A63B 2024/0071; A63B 2024/0081; G06F 17/30; G06F 17/3053
See application file for complete search history.

(56) References Cited

U.S. PATENT DOCUMENTS

| | | |
|---|---|---|
| 5,513,854 A | 5/1996 | Daver |
| 6,013,007 A | 1/2000 | Root |
| 8,172,722 B2 | 5/2012 | Molyneux |

(Continued)

*Primary Examiner* — Steven J Hylinski
(74) *Attorney, Agent, or Firm* — Maginot, Moore & Beck LLP

(57) ABSTRACT

A method of identifying the occurrence of one or more organized athletic events including a plurality of participants is disclosed. The method includes receiving athletic activity data for the participants from a plurality of athletic activity monitoring devices carried by the participants. The received athletic activity data defines workouts performed by the participants. The method further includes defining a plurality of parameters for the athletic activity data, wherein the parameters define common athletic activity data for the participants of each of the organized athletic events. In addition, the method includes clustering the athletic activity data into one or more clusters of workouts based on the defined parameters for the athletic activity data. Furthermore, the method includes identifying the one or more organized athletic events based on the one or more clusters of workouts.

20 Claims, 8 Drawing Sheets

FIG. 2

(56) References Cited

U.S. PATENT DOCUMENTS

| | | |
|---|---|---|
| 8,417,780 B2 | 4/2013 | Jennings |
| 8,574,049 B1 | 11/2013 | Ackerman |
| 8,719,198 B2 | 5/2014 | Zheng |
| 9,314,685 B2 | 4/2016 | Balakrishnan |
| 2007/0005419 A1 | 1/2007 | Horvitz |
| 2007/0117576 A1 | 5/2007 | Huston |
| 2008/0096726 A1 | 4/2008 | Riley |
| 2009/0233771 A1 | 9/2009 | Quatrochi |
| 2010/0030350 A1 | 2/2010 | House |
| 2010/0048358 A1 | 2/2010 | Tchao |
| 2010/0131502 A1 | 5/2010 | Fordham |
| 2010/0184563 A1 | 7/2010 | Molyneux |
| 2011/0098928 A1 | 4/2011 | Hoffman |
| 2012/0015778 A1 | 1/2012 | Lee |
| 2012/0142429 A1 | 6/2012 | Muller |
| 2012/0253485 A1 | 10/2012 | Weast |
| 2012/0283855 A1 | 11/2012 | Hoffman |
| 2013/0073400 A1 | 3/2013 | Heath |
| 2013/0096843 A1 | 4/2013 | Yuen |
| 2013/0204410 A1 | 8/2013 | Napolitano |
| 2013/0297422 A1 | 11/2013 | Hunter |
| 2013/0304377 A1 | 11/2013 | Van Hende |
| 2013/0325394 A1 | 12/2013 | Yuen |
| 2013/0325396 A1 | 12/2013 | Yuen |
| 2013/0325404 A1 | 12/2013 | Yuen |
| 2013/0332286 A1 | 12/2013 | Medelius |
| 2014/0012918 A1 | 1/2014 | Chin |
| 2014/0039840 A1 | 2/2014 | Yuen |
| 2014/0122494 A1 | 5/2014 | Thurston |
| 2014/0163927 A1 | 6/2014 | Molettiere |
| 2014/0164611 A1 | 6/2014 | Molettiere |
| 2015/0088457 A1 | 3/2015 | Yuen |
| 2017/0148346 A1 | 5/2017 | White |
| 2017/0266494 A1 | 9/2017 | Crankson |

SYSTEM AND METHOD FOR DETERMINING THE OCCURRENCE OF ORGANIZED ATHLETIC EVENTS

CROSS-REFERENCE TO RELATED APPLICATIONS

This document is a continuation of and claims priority from U.S. patent application Ser. No. 14/796196, filed Jul. 10, 2015, the entire contents of which are incorporated herein by reference.

FIELD

This document relates to the field of activity tracking systems, and particularly to systems and methods for analyzing activity data from multiple individuals and determining the occurrence of one or more athletic events.

BACKGROUND

As used herein, the term "organized athletic event" refers to an event wherein a predetermined minimum number of humans gather and participate in a defined athletic activity at about the same time or within a defined time. Organized athletic events typically include some rules or guidelines for the athletic activity (e.g., a particular course to run for an agreed upon distance), which rules or guidelines are defined and controlled by an event organizer. The event organizer may be a single individual, a group of individuals, a corporate entity (whether profit or not-for-profit) or other entity. Examples of "organized athletic events" may include marathons, 5 K runs, charity walks, hikes, swims, bike races, motor sports challenges, and ball games. The foregoing examples of "organized athletic events" are offered herein by way of example only and without limitation. It will be recognized that numerous other organized athletic events are possible. The term "event" may also be used herein to refer to an "organized athletic event".

Organized athletic events occur at various times and locations throughout the world on a daily basis. These organized athletic events include running events such as marathons, half-marathons or 5 K runs, cycling events such as century rides, road races, or mountain bike races, or winter sporting events such as downhill or cross-country skiing races. Athletes competing in such events are often interested in knowing how their performance compares to others competitors. Accordingly, when a runner or cyclist participates in an organized athletic event, the organizers of such event will often provide the competitor with information about his or her performance within the event. Unfortunately, the information is often incomplete or lacking in detail. For example, a runner may be told that he finished 20$^{th}$ out of two hundred participants in a marathon in a particular city. However, the runner may be interested in receiving more information than the organizers of the race are capable of providing. For example, the runner may wish to know how his or her performance on a given day compared to the performance of other runners nationwide or worldwide on the same day or for the year. Unfortunately this information is very difficult or impossible to obtain as race data is typically only maintained and shared at the discretion of the organizer, or is only maintained for a limited number of races in a limited number of cities.

In addition to the above, athletes may also be interested in receiving additional messages based on organized athletic event the athlete recently participated in. For example, a runner may be interested in receiving advertising about a local shoe store or healthy restaurant that is in the same city as a recently completed marathon. As another example, a runner may be interested in receiving a motivational message recognizing the runner's participation in a recently completed marathon, providing information about training programs for marathons, and informing the athlete of future marathons in his or her area. Such advertising and motivational messages are typically only provided by the event organizer, and the athlete is unable to receive any advertising or motivational messages from other groups. Accordingly, even though information and support may be available for the athlete, the athlete may have a difficult time receiving this information and support unless it is provided by an event organizer.

In view of the foregoing, it would be advantageous to providing a system and method for determining the occurrence of organized athletic events. It would also be advantageous to share information and messages with participants of such organized athletic events. For example, it would be advantageous to identify an athlete that ran in a marathon, provide the athlete with statistical information about his or her performance, and advertise goods or services that the athlete may be interested in based on his or her participation in the marathon.

SUMMARY

In accordance with one exemplary embodiment of the disclosure, there is provided a method of identifying the occurrence of one or more organized athletic events. Each of the organized athletic events includes a plurality of participants. The method comprising receiving athletic activity data for the participants from a plurality of activity monitoring devices carried by the participants. The received athletic activity data defines workouts performed by the participants. The method further comprises defining a plurality of parameters for the athletic activity data, wherein the parameters define common athletic activity data for the participants of each of the organized athletic events. In addition, the method comprises clustering the athletic activity data into one or more clusters of workouts based on the defined parameters for the athletic activity data. Furthermore, the method comprises identifying the one or more organized athletic events based on the one or more clusters of workouts, identifying the participants of at least one of the one or more athletic events, and transmitting a message to the identified participants In accordance with another exemplary embodiment of the disclosure, there is provided an arrangement for identifying the occurrence of one or more organized athletic events, wherein each of the organized athletic events having a plurality of participants. The arrangement comprises a plurality geo-position devices configured to be carried by the participants. Each of the geo-position devices includes at least one sensor configured to obtain the athletic activity data for the participant, the athletic activity data defining a workout for the participant. The arrangement further comprises a database configured to store the athletic activity data. Furthermore, the arrangement comprises an activity data processing system. The activity data processing system is configured to (i) cluster the athletic activity data into one or more clusters of workouts based on parameters for the athletic activity data, the parameters defining common athletic activity data for the participants, and (ii) identify the one or more clusters of workouts as indicating the existence of the one or more organized athletic events.

In accordance with yet another exemplary embodiment of the disclosure, there is provided a non-transient computer readable medium containing instructions for identifying an organized athletic event including a plurality of participants. The non-transient computer readable medium contains instructions for identifying the organized athletic event by receiving athletic activity data for the participants from a plurality of activity monitoring devices carried by the participants, the athletic activity data defining workouts performed by the participants. In addition, the non-transient computer readable medium contains instructions for identifying the organized athletic event by clustering the athletic activity data into one or more clusters of workouts based on parameters for the athletic activity data, the parameters defining common athletic activity data for the participants. Furthermore, non-transient computer readable medium contains instructions for identifying the one or more clusters of workouts as indicating the existence of the organized athletic event and for sending a message to the participants of the organized athletic event.

The above described features and advantages, as well as others, will become more readily apparent to those of ordinary skill in the art by reference to the following detailed description and accompanying drawings. While it would be desirable to provide an activity tracking system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DESCRIPTION

Figure 1:
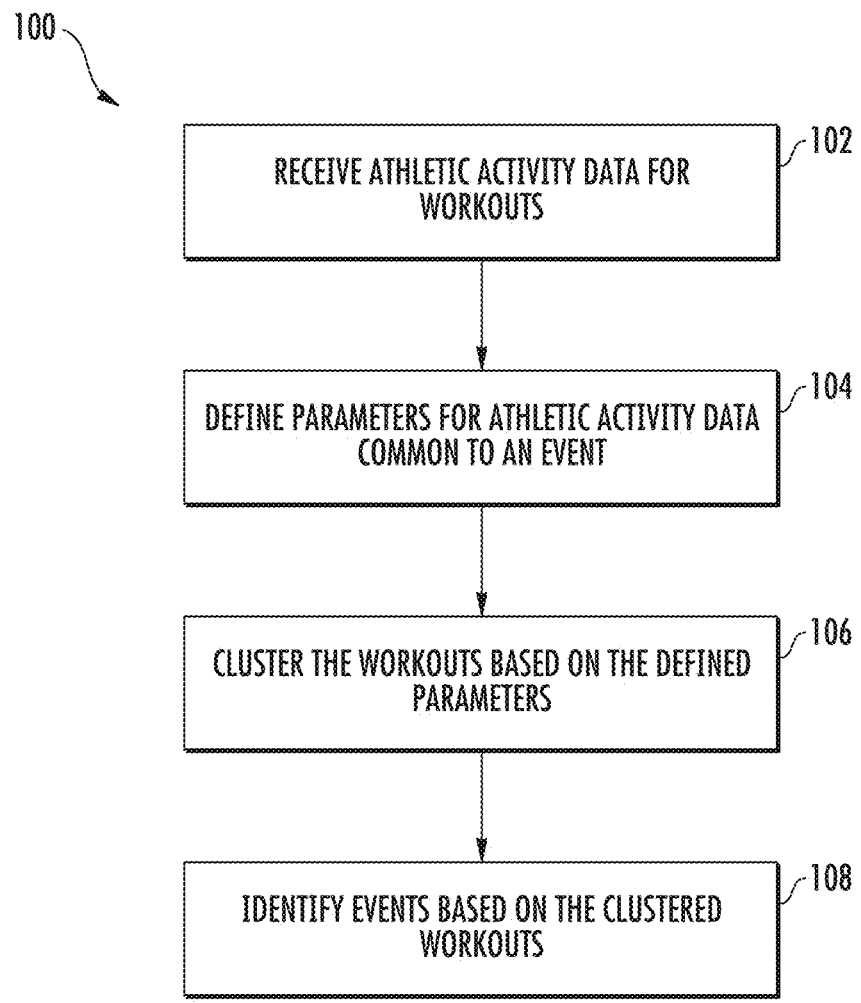
FIG. 1 is a block diagram of a method for determining the occurrence of organized athletic events using an activity tracking system.

With reference now to FIG. 1, an exemplary method for determining the occurrence of organized athletic events 100 is shown. The method includes receiving activity data for a plurality of workouts, as shown by step 102 of FIG. 1. The workouts are monitored using an activity tracking system having a plurality of athletic activity monitoring devices worn by individuals. As shown in step 104, the method further includes defining a plurality of parameters for the athletic activity data, the plurality of parameters define athletic activity data common to the multiple participants of each of the one or more organized athletic events. In addition, as shown in step 106, the method includes clustering the plurality of workouts based on the defined plurality of parameters for the athletic activity data. Thereafter, as shown in step 108, the method includes identifying the one or more organized athletic events based on the clustered plurality of workouts.

Activity Tracking System

Figure 2:
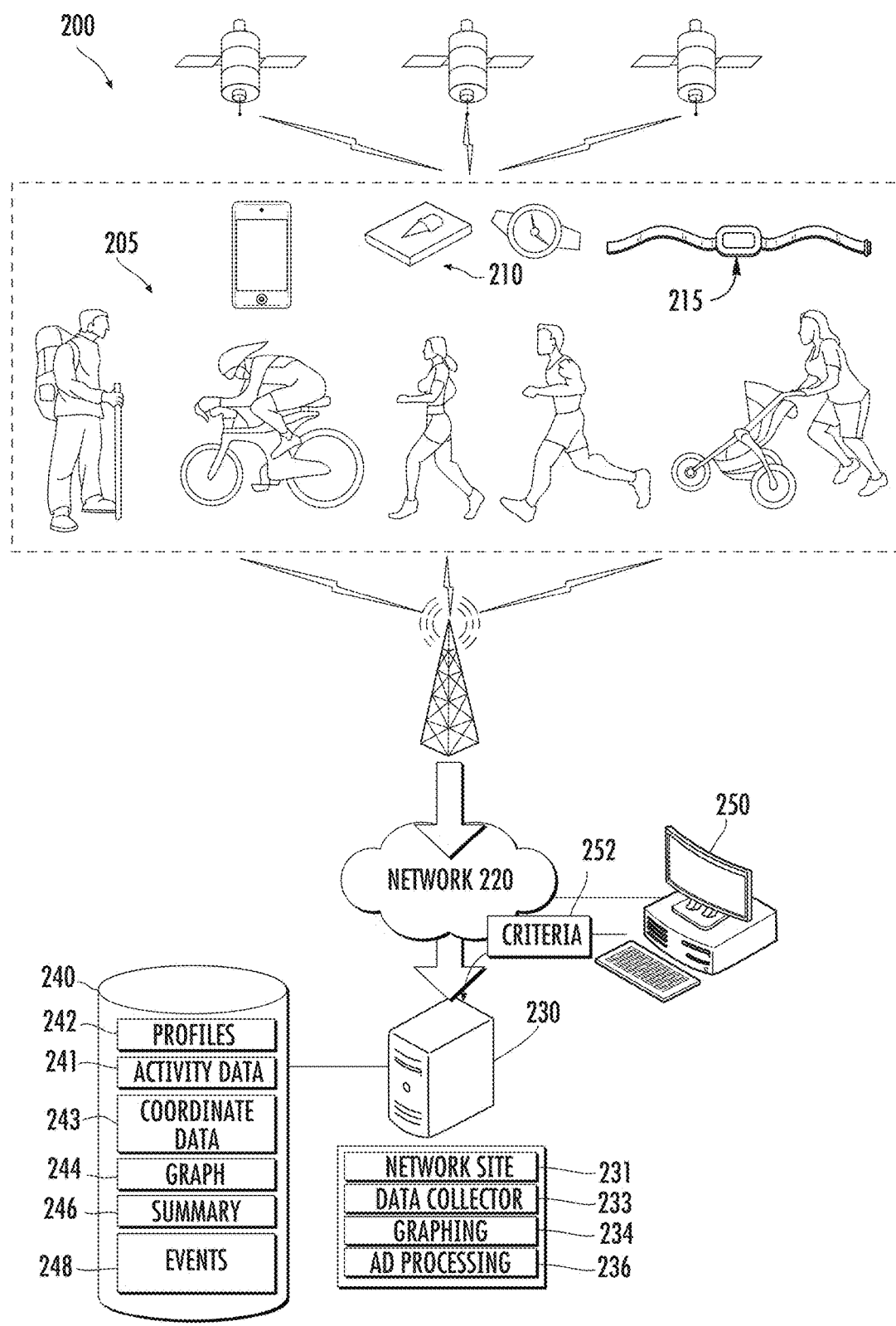
FIG. 2 is a diagram illustrating an embodiment of an activity tracking system configured to provide activity data and generate a map.

With reference now to FIG. 2, a diagrammatic representation of an exemplary activity tracking system 200 is shown. The activity tracking system includes Global Positioning System (GPS) enabled devices 210 or other geo-position devices in communication with a server 230 or other remote computer over a network 220. As shown in FIG. 2, the GPS-enabled devices 210 are configured to be worn, carried, or otherwise associated with a user 205 during an athletic activity, receive GPS signals from GPS satellites 290, and process the GPS signals in order to collect GPS data for the user 205 during the athletic activity.

GPS-enabled devices 210 include devices configured with GPS receivers. Examples of such GPS-enabled devices include smartphones, tablet computers, GPS watches, etc. GPS data collected by the GPS-enabled devices 210 may include, for example, timestamp, latitude, longitude, distance and elevation data. GPS data is typically collected and determined on a real-time basis with the GPS-enabled devices 210.

In addition to collecting GPS data, The GPS-enabled devices 210 may also be configured to collect sensor data from one or more sensors 215 which are associated with the GPS-enabled device. Sensors associated with the GPS-enabled device 210 may be housed within the GPS-enabled device or separately from the GPS-enabled device. If housed separately from the GPS-enabled device a wireless connection is typically established between the GPS-enabled device and the sensor to allow the sensor to transmit sensor data which is received by the GPS-enabled device. Exemplary sensors may include heart rate monitors, accelerometers, breathing sensor, temperature sensors, or any of various other sensors typically associated with athletic activity. Exemplary sensor data may include heart rate, power, motion, movement, speed, range, distance, acceleration data, etc. Sensor data may include physiological data (e.g., heart rate, breathing rate, temperature, etc.) or contextual readings or calculations (e.g., distance travelled, acceleration, etc.), or estimates of such associated with various physical activities of the user.

Sensor data may be collected or determined in real time or on a regular basis. The term "activity data" or as used herein refers to one or both of GPS data and sensor data. Activity data may be collected during the course of human fitness activities or during human activities powered by non-human means, such as motorsports. The term "workout" refers to human movement and activity associated with physical fitness, such as running, jogging, walking, human powered cycling, or similar human powered activity. The term "athletic activity data" refers to activity data collected for a workout.

In order to collect and process the activity data, the GPS-enabled devices 210 typically include a plurality of electronic components including receivers, memories, processors, I/O devices, and transmitters. The GPS-enabled devices 210 may be configured to process the activity data to determine any of various additional athletic parameters for the user. In addition to collecting and processing the activity data, the GPS-enabled devices 210 may also be configured to display the activity data on a display screen, allowing the user 205 to view the activity data and any additional athletic parameters for the user. Furthermore the GPS-enabled devices 210 include transmitters that are configured to transmit the activity data to the server 230 over the network 220 (e.g., the Internet, cellular network, LAN or other network). Such transmitters are typically wireless transmitters (e.g., cellular network transmitters, WiFi transmitters, etc.). However, in at least one embodiment, the transmitters may be used in association with data ports requiring a physical (i.e., wired) connection to another device prior to transmission of the data.

With continued reference to the embodiment of FIG. 2, the activity tracking system 200 includes a computing device (i.e., one or more computing devices), such as the server 230 (which may comprise a plurality of servers) configured to perform a plurality of functions embodied in various subsystems. Examples of such functions and subsystems include, but are not limited to, network site system 231, data collector system 233, graphing system 234, and activity data processing system 236. These functions and subsystems are typically provided as processing instructions stored on any of various types of computer readable media such as magnetic or optical discs, RAM or ROM memory, or any of various other computer-readable media. Those skilled in the art will appreciate that the example shown in FIG. 2 is non-limiting and that configuration of activity tracking system 200 may vary from implementation to implementation.

The GPS data may be stored by GPS-enabled devices 210 during an athletic activity performed by a user (e.g., walking, jogging, running, biking, etc.). This GPS data provides the geo-position information for the recorded activity (e.g., latitude and longitude data). As discussed previously, the GPS-enabled devices 210 may optionally record other data, such as the user's heart rate or power, at a varied sample rate (e.g., 1-100 Hz or other rate) depending on the activity type, and any additional information (e.g., cadence, stride rate, etc.) as appropriate, depending on the particular GPS-enabled device that is used.

When an activity is completed by the user, the user instructs the device to send the recorded activity data over network 220 to the server 230. This can be sent directly if the device (such as a smartphone) has the capabilities. Otherwise, the device may be linked to a networked computer in order to deliver data. In other embodiments, the data may delivered real time or near real time using any of various networks.

The device 210 can provide this time series data for the activity, create a data file that is temporarily stored in memory, and send the data file. An example of activity data is provided in table 1, below.

TABLE 1

| timestamp | latitude | longitude | sensor data (e.g., heart rate) |
|---|---|---|---|
| 1.043567 | −97.3453452345 | 35.234523456 | 150 |
| 2.2345 | −97.3336362255 | 35.231213451 | 151 |

TABLE 1-continued

| timestamp | latitude | longitude | sensor data (e.g., heart rate) |
|---|---|---|---|
| 3.2345452 | −97.3336234534 | 35.193245234 | 150 |
| 4.234535 | −97.3434560120 | 35.225234623 | 150 |

The activity data in the table above includes GPS data and sensor data provided by a heart rate monitor. However, it will be recognized that the activity data may include any of various types of GPS data or sensor data, including various types of physiological and contextual data. For example, the activity data may include workout type, workout start time, workout end time, altitude data, acceleration data, speed data, heart rate data (e.g., max or average), route identification, cadence data, distance data, or any of various other types of GPS data or sensor data.

Much of the activity data collected for a workout will be determined automatically by the GPS-enabled device 210. However, in some instances, manual entry of activity data may be requested. For example, depending on the type of GPS-enabled device, the device may require the user to enter a type of workout (e.g., biking, running, walking, etc.). However, in many situations, the type of workout may be determined automatically by the system depending on the activity data (e.g., accelerometer data may indicate whether the workout was a hike or a run). As another example of data that may need to be entered manually by the user, the GPS-enabled device may require the user to indicate the start of a workout manually by touching a physical button (e.g., a button on a watch or a smartphone), touching a virtual button (e.g., a button displayed on a touchscreen), or speaking to the GPS-enabled device that the workout should begin. However, in at least one embodiment, the GPS-enabled device may be configured to automatically determine the start of a workout based on sensor signals (e.g., signals from an accelerometer indicating that the user started running at a particular time and has continued running for some period of time). After a start time has been established, a start position providing latitude and longitude for the user at the start of a workout may be automatically collected and stored. Thereafter, much of the activity data collected will occur automatically during the course of the workout, depending on the GPS-enabled device being used (e.g., acceleration, velocity, distance traversed, heart rate, course taken, etc.). At the end of the workout, the completion of the workout may be determined either manually or automatically, depending on the GPS-enabled device used for the workout.

With continued reference to FIG. 2, network site 231 can provide a site accessible over a network such as the Internet or other network with an interface, such as an API, REST interface, thick client interface or other interface to allow GPS-enabled devices 210 or other client devices to interact with activity tracking system 200 to provide activity data and receive information. According to one embodiment of the activity tracking system 200, activity data may be forwarded to the server 230 over the network 220 by a mobile application on the GPS-enabled device that identifies a user associated with the GPS data and an indicator that the activity data is associated with a workout, a type of activity (e.g., running, cycling, rowing or other activity).

Data collector 233 is configured to store the received activity data in a data store 240. The data store 240 is configured to store a large amount of activity data associated with users and workouts. In particular, as discussed in further detail below, activity data from large numbers of users is stored in the data store 240 over large periods of time. The data store 240 may be provided in any of various forms such as magnetic or optical disc or tape, electronic memory, or any of various other forms. Because of the large amounts of data contained in the data store 240, the data store 240 is generally provided as secondary storage, but could be provided within the main memory of primary storage. In other embodiments, the data store 240 may be provided as tertiary storage or even offline storage.

The data collector 233 stores the data collected from the GPS-enabled devices 210 in the data store 240 as activity data 241. Data for each workout is stored as a record in the activity data 241. Additionally, activity tracking system 200 may maintain profile data 242 for users, such as demographic information, within the data store 240. Profile data 242 may include, by way of example but not limitation, age, gender, height, weight, preferences, performance level (e.g., beginner, intermediate, professional, etc.) or other information. Coordinate data 243 may also be included in the data store 240, wherein known maps and networks of paths are defined and/or path traversal for workouts are stored a series of coordinates. Thus, it will be recognized that activity data 241 and profile data 242 may be stored such that GPS tracks (i.e., traversals of a particular street or path network defined by time-series GPS data) are associated with workouts (e.g., by unique work ids), users, dates and other information. Furthermore, the data store 240 may include workout summary database 246 wherein the workouts collected by the activity tracking system 200 are summarized as a subset of the activity data. As explained in further detail below, the workout summary database 246 may include a subset of fields of the activity data such as start time, start location, distance travelled, and workout type.

Mapping system 234 is configured analyze GPS tracks (such as GPS tracks of activity data 241) and construct a graph 244 which is stored in memory of the data store 240. Mapping system 234 may create a visual representation of a graph 244 as a map that can be viewed on a client device such as a GPS-enabled device 210 or client device 250 connected to the server 230 to show the path traversed by the user 205 during a workout.

Activity data processing system 236 is configured to process the received activity data for workouts and place it into proper form for storage in the database of the data store 240 that stores activity data 241. For example, all user names are processed to be become lower case, which is the proper format for the database. As another example, if the received activity data from a GPS-enabled device does not include distance traversed during a workout, the activity data processing system 236 determines a distance travelled based on the latitude and longitude data points collected for the workout.

In addition to processing activity data for individual workouts, the activity data processing system 236 may also be configured to perform additional processing on the activity data. For example, as explained in further detail below, the activity data processing system 236 may perform a clustering algorithm on the activity data. In association with this, the activity data processing system 236 may also calculate distances between starting points for workouts. If starting points are plotted on a map, latitude/longitude data points may be changed to a coordinate system called the Mercator projection. Distances between these starting points will be in Mercator units. However, Mercator units change relative to latitude. Near the equator, such as in Brazil, a Mercator unit is relatively close to a meter. However, in latitudes nearer the poles, such as in Finland, a Mercator unit is closer to two meters. Therefore, the activity data processing system 236 will need to account for Mercator units when determining distances between starting points, as latitude/longitude changes will represent smaller distances as the starting points move farther from the equator.

Activity Tracking System within a Network Computing Environment

Figure 3:
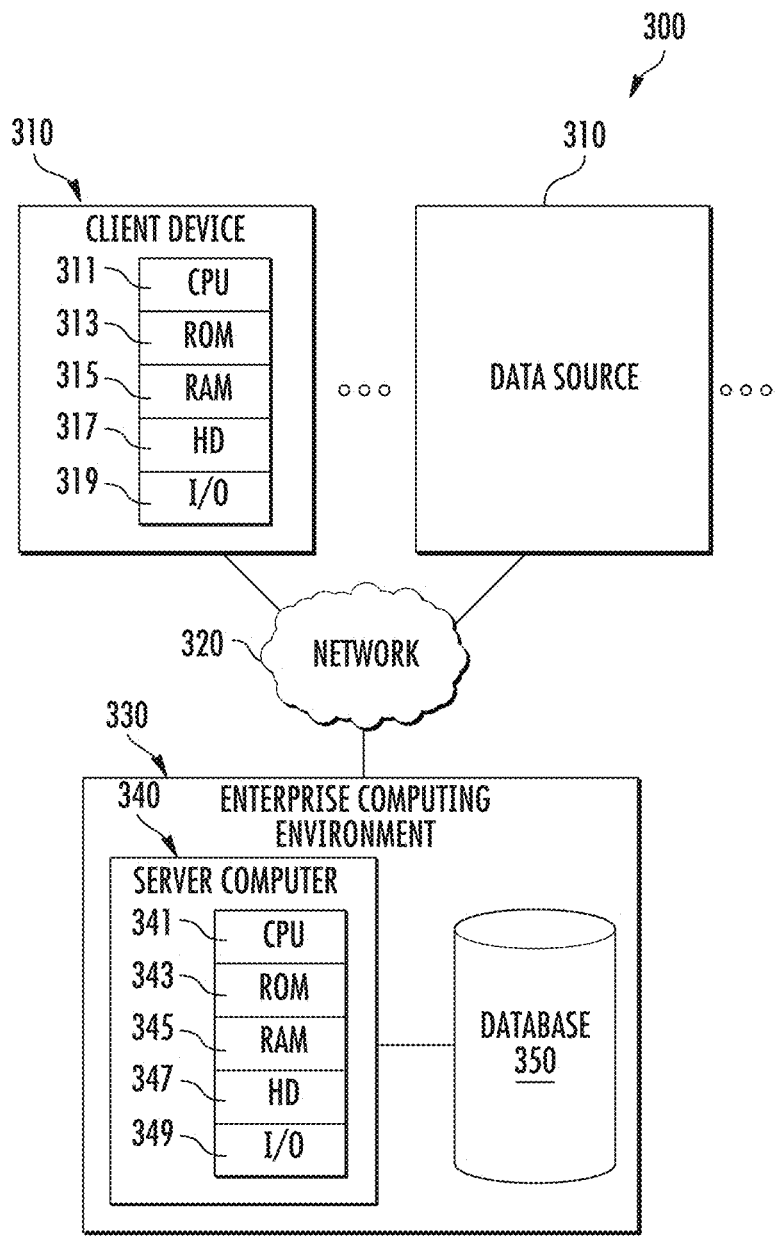
FIG. 3 is a diagram of a computer network computing environment including a client computer and a server computer for the activity tracking system of FIG. 2.

With reference now to FIG. 3 a diagrammatic representation of one embodiment of a network computing environment 300 is shown that may be used to implement the activity tracking system 200. For purposes of clarity, a single client computer 310, a single server computer 340, and a single data source 360 are shown in the figure. The client computer 310, server computer 340 and data source 360 represent an exemplary hardware configuration of data processing systems that are capable of bi-directionally communicating with each other over a public network such as the Internet. Those skilled in the art will appreciate that network computing environment 300 may comprise multiple server computers, and multiple client computers and data sources may be bi-directionally coupled to enterprise computing environment 330 over network 320.

Client computer 310 is a GPS-enabled device, such as GPS-enabled device 210 described previously with reference to FIG. 2. The client computer 310 can include central processing unit ("CPU") 311, read-only memory ("ROM") 313, random access memory ("RAM") 315, ("HD") or storage memory 317, and input/output device(s) ("I/O") 319. I/O 319 can include a keyboard, monitor, printer, and/or electronic pointing device. Example of electronic pointing devices for I/O 319 may include mouse, trackball, stylist, touch screen, or the like. Client computer 310 can include a cellular phone, a smart phone, a GPS phone, or any device capable of geo-tagging and communicating over a network.

Server computer 340 may have similar hardware components including CPU 341, ROM 343, RAM 345, hard drive 347, and I/O 349. Data source 360 may be a server computer having hardware components similar to those of client computer 310 and server computer 340, or it may be a data storage device. Server computer 340 in association with client device 310 may provide one embodiment of an activity tracking system.

The data source 360 includes any device that may provide data to the network 320 for use in the activity tracking system 200. For example, activity data may be provided to the client device 310 in the form of GPS data or sensor data. This activity data may then be transferred to the server computer 340 over the network 320. As another example, sensor data from a workout may be downloaded by the user to another computer and then delivered to server computer 340 over the network 320. In at least one embodiment, server computer 340 may also share data (e.g., application updates, etc.) to the client device 310 over the network 320.

Each computer 310 and 340 shown in FIG. 3 is an example of a data processing system. ROM 313 and 343, RAM 315 and 345, storage memory/drives 317 and 347, and database 350 can include media that can be read by CPU 311 and/or 341. Therefore, these types of computer memories include computer-readable storage media. These memories may be internal or external to computers 310 and/or 340.

As will be recognized by those of ordinary skill in the art, portions of the methods described herein may be implemented in suitable software code that may reside within ROM 343, RAM 345, hard drive 347, database 350, data source 360 or a combination thereof. In some embodiments, computer instructions implementing an embodiment disclosed herein may be stored on a direct access storage device (DASD), magnetic device, disk device, optical storage device, or other appropriate computer-readable storage medium or storage device. A computer program product implementing an embodiment disclosed herein may therefore comprise one or more computer-readable storage media storing computer instructions translatable by CPU 341 to perform an embodiment of a method disclosed herein.

A "computer-readable medium" may be any type of data storage medium that can store computer instructions and/or data, including, read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

Collection of Activity Data

The activity tracking system is used to collect activity data from users across wide geographic regions on a continuing basis. Indeed, the activity tracking system may be configured to collect activity data from an athlete at any location in the world where the athlete is carrying a GPS-enabled device 210 and is connected to the network 220. For example, activity data may be collected for athletes using a GPS-enabled device 201 in association with the activity tracking system 200 in any of vast regions of North America, Europe, or other continents where cellular telephone networks are available, such as regions near larger cities. The collection of activity data may not be possible in more remote regions or in countries lacking wide-ranging cellular networks and Internet service. However, even in more remote regions, it may be possible for the athlete to store activity data on his or her GPS-enabled device 210 and then download the activity data to the server 230 at a later time when a connection to the network 220 is established.

Figure 4:
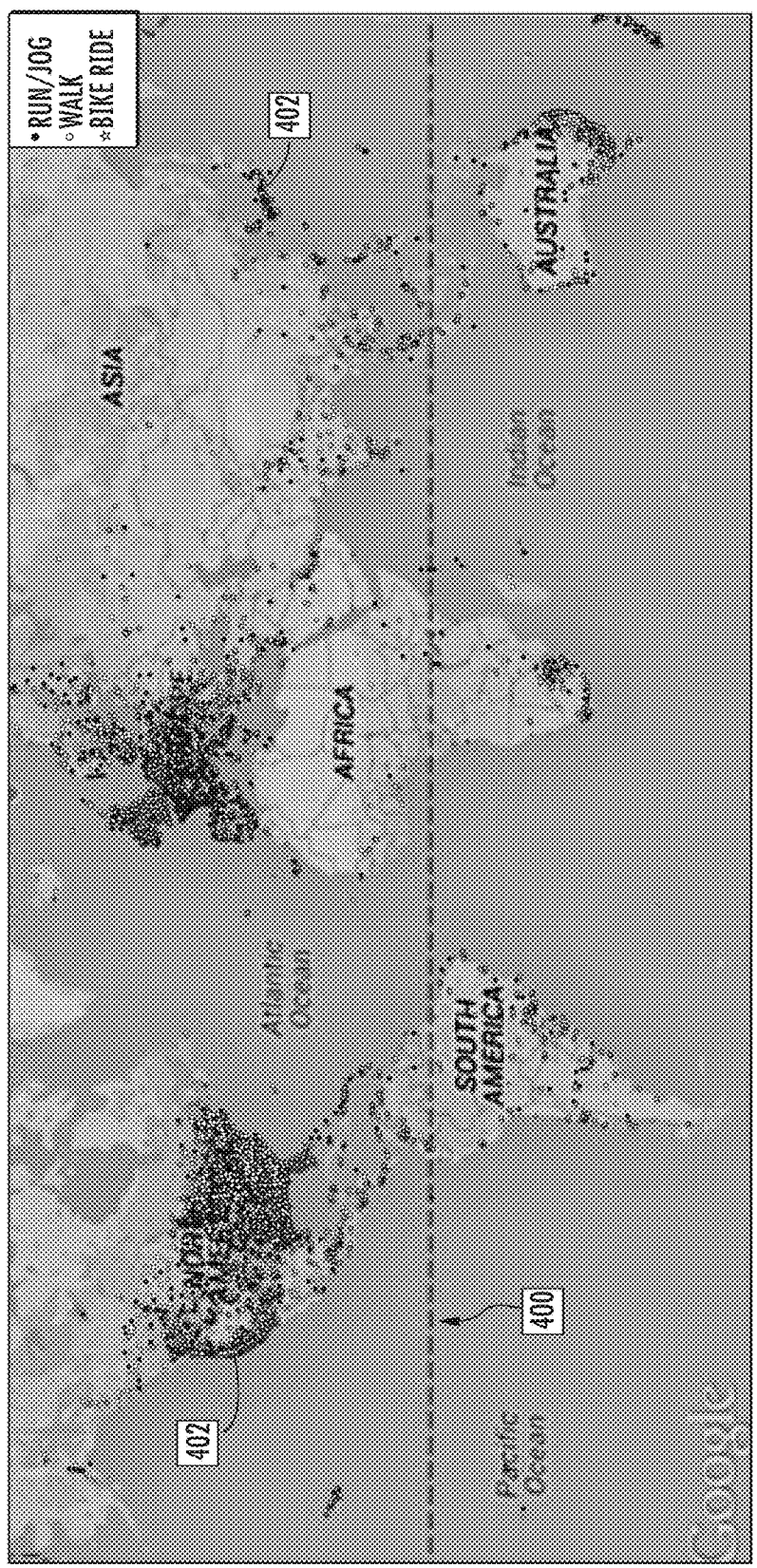
FIG. 4 is an exemplary map illustrating worldwide locations from which activity data is collected using the activity tracking system.

FIG. 4 shows an exemplary map 400 of the earth. Each point 402 on the map 400 represents a location where activity data for a workout was collected on a particular day. As expected, most of the activity data was received in the United States, Canada, and Europe. However, as shown on the map 400, a significant amount of activity data was also collected in other regions, such as Brazil, Mexico, Japan, South Africa, and Australia. In an exemplary day, activity data for large quantities of workouts may be received by the activity tracking system 200. For example, in a given day, activity data for 500,000 to 1,000,000 or more workouts may be collected by the activity tracking system 200. This metadata alone is of limited value to the activity tracking system 200. However, as explained herein, proper processing of the metadata will provide valuable tools that may be used by individuals, event organizers, vendors, and others interested in group fitness or related activities.

The activity data for a day of workouts (or workouts completed within the past 24 hours) is stored in the data store 240 of the activity tracking system 200. As discussed above, the data store 240 includes a number of databases or other collections of data. In at least one embodiment, the databases are relational databases, but any of various types of databases may be used, as will be recognized by those of ordinary skill in the art. The databases in the data store 240 include the activity data 241, the user profiles database 242, and the workout summary database 246, as shown in FIG. 2.

As discussed previously, the activity data 241 includes all data collected from the GPS-enabled devices 210. This data may include, for example, latitude, longitude, workout type, workout start time, workout finish time, split times, altitude data, acceleration data, speed data, heart rate data (e.g., max or average), route identification, cadence data, distance data, or any of various other types of activity data.

Because of the large amount of data collected from the GPS-enabled devices, it may be advantageous to reduce the data, or to subdivide the data into particular desired categories prior to processing. One method for reducing the data in the data store 240 is to employ a cleanup function in order to eliminate spurious or otherwise irrelevant data. For example, if a user inadvertently started and stopped a workout (e.g., the distance field is close to zero), such record may be automatically analyzed and eliminated by the activity tracking system as irrelevant. As another example, if a user mistakenly left his or her GPS-enabled device on during a drive across the country, the distance or speed for the workout will fall outside of a threshold, and this record may be analyzed and eliminated as being spurious or otherwise irrelevant.

One method for sub-dividing the data in the data store 240 is to pull out only data that meets certain conditions. For example, each record of the activity data may identify a "workout type" (which may be entered by the user at the beginning of a workout or automatically determined by the GPS-enabled device based on sensor outputs). These workout types may include one of a limited number of entries such as running, biking, hiking, walking, skiing, etc. In order to further analyze one of these categories, the data for a given day and a given category may be saved as a CSV (comma separated value) file and then imported into another database in the datastore 240, such as the workout summary database 246. For example, if there is an interest in processing data from workout types that are running or walking workouts, those workouts (or selected attributes of such workouts) may be copied from the activity data and saved in an additional database of the data store 240 for further processing by the activity tracking system 200. Storing the copied data in the additional database facilitates faster processing of the data by the activity tracking system.

The workout summary database 246 provides a table that is a subset of records and attributes taken from the activity data 241. For example, the workout summary database 246 may only provide records that are categorized as running or walking type workouts. In addition, the workout summary database may limit the attributes for such records to a particular set of attributes of interest. Table 2 below provides an example of five records of an exemplary workout summary database. Each of the records is a walk or run workout category and only five attributes is associated with each record.

TABLE 2

| userID | workout start time | start latitude | start longitude | distance |
|---|---|---|---|---|
| User1 | 07:58 | −97.3453452345 | 35.234523456 | 42.305 |
| User2 | 08:01 | −97.3336362255 | 35.231213451 | 42.008 |
| User3 | 07:59 | −97.3336234534 | 35.193245234 | 42.297 |
| User4 | 08:00 | −97.3434560120 | 35.225234623 | 42.853 |
| User5 | 07:59 | −97.3456012078 | 35.252345609 | 42.744 |

As shown above, each record of the workout summary database includes five attributes. The first attribute in the table simply identifies the user that performed the workout (e.g., User 1). The second attribute defines a workout start time (e.g., 07:58). The third and fourth attributes indicate a longitude and latitude for the user at the workout start time (e.g., −97.3453452345 and 35.234523456). Finally, the fifth attribute indicates a total distance travelled for the user during the workout (e.g., 42.305 km, in this case, slightly greater than the distance of a standard marathon of about 26.2 miles).

In the example of Table 2, the attributes for each record in the workout summary database are attributes that are generally collected automatically by the GPS-enabled device 210. For example, after the user has created a profile in the activity tracking system 200 and associated that profile with a GPS-enabled device, all activity data collected by the GPS-enabled device may be periodically uploaded to the server 230 via the network 220 and associated with the user in the activity tracking system 200.

The attributes described above are but a few of the many attributes that may be collected for a workout. Another example of an attribute that may be defined for a workout is a waypoint. The waypoint attribute may be defined as a latitude/longitude for a user at some percentage of the total distance of the workout (e.g., the latitude/longitude at ½ or ¼ of the total distance traversed). This waypoint can be calculated from the activity data because the GPS-enabled device 210 periodically captures the longitude and latitude of each participant during his or her workout. This captured data is then periodically transmitted to the activity tracking system 200 during the workout (or possibly at the completion of the workout). At the end of the workout, the activity tracking system 200 is configured to determine a total distance travelled. In association with this total distance travelled, the activity tracking system 200 may also be configured to determine the latitude/longitude of the user at the designated waypoint (e.g., the latitude/longitude at the ½ or ¼ distance point, based on the total distance travelled).

In addition to those attributes discussed above, including waypoints, distance travelled, start location, end location, start time, etc., it will be recognized that the activity tracking system may be further configured to track any of various additional attributes for a workout. Each of these attributes may be useful in determining the existence of organized athletic events, as described in further detail below.

Defining Parameters Common to Participants of an Organized Athletic Event

With the activity data collected and stored in a database (e.g., either the larger activity data database 241 or the more concise workout summary database 246), the activity data may be processed in order to determine whether any organized athletic events occurred during the day (or within some other period of time). In at least one embodiment, the goal of finding the existence of organized athletic events within the large set of activity data is accomplished by defining parameters for the organized athletic events, and then using a clustering method to find workouts that suggest the existence of organized athletic events.

Prior to clustering, a plurality of parameters is defined for attributes of the activity data. Attributes of the activity data falling within such parameters are common to individuals participating in the desired type of organized athletic event. For example, if the system administrator is interested in identifying participants in marathons, a number of parameters common to such marathon participants may be defined. These defined parameters may include, for example, proximity of starting location (e.g., the participants started within 200 meters of one another), proximity of starting time (e.g., the participants started within a half mile of one another), and a distance range (e.g., participants traversed between 41.5 and 43.0 kilometers). Another example of a defined parameter may be a waypoint parameter (e.g., the location of each participant at the ½ distance point of the workout is not more than 1000 meters away from other participants at their ½ distance point).

The defined parameters are strategically defined by the system administrator or other qualified user of the activity tracking system in an attempt to identify individuals who participated in and completed certain organized athletic events (e.g., a marathon). It will be recognized that the defined parameters may be different or different parameters may also be used. For example, instead of the distance traversed parameter having a tolerance range of 1.5 kms (i.e., 41.5-43.0 km), the distance range parameter could be defined over a smaller or greater distance (e.g., a tolerance range of 0.5 or 2.5 km). As another example, an ending location parameter could be defined in addition to or in lieu of the defined starting location parameter. In at least one embodiment, the ending location parameter may have a slightly greater tolerance than the starting location parameter, as athletes more concerned with simply completing an event than in logging a time for an event may forget to immediately terminate their workout on the GPS-enabled device upon completion of the organized athlete event. Additionally, it will be recognized that in various embodiments the defined parameters may also change depending on the targeted organized athletic event. For example, if the activity tracking system is used to identify participants in a century bike ride, the defined distance may be increased to around 100 miles.

Clustering of Workout Data to Identify Organized Athletic Events

After parameters for the organized athletic events are defined, an attempt is made to identify the workouts that meet the defined parameters. In at least one embodiment, this is accomplished using a clustering algorithm that is applied to the activity data database 241 (or the workout summary database 246). It will be appreciated that any of various different clustering algorithms may be used to identify the workouts that meet the defined criteria, including centrally-based clustering algorithms, density based clustering algorithms, or any of various other types of clustering algorithms. In at least one embodiment, a density based clustering algorithm called DBSCAN ("Density Based Spatial Clustering in Applications with Noise") is used.

The clustering is based on several defined parameters, and particularly the defined parameters for the organized athletic events, as discussed above. For example, the clustering may be based on (1) starting proximity (e.g., within 200 meters of each other at start), (2) similar distance traversed (e.g., about 42 kilometers), and (3) start time proximity (e.g., within 15 minutes of each other at start). In this example, the clustering is based on data points being a vector of length 4 (i.e., there are four coordinates associated with each data point, so each data point may be considered to exist in four-dimensional space). The clustering procedure may also involve some filtering such that only clusters with a minimum number of workouts per cluster (e.g., 50 users) are recognized. As another example, if the activity tracking system 200 is only interested in running events, all clusters that represent biking, hiking or other types of events may be filtered out from the relevant results.

If the data points (i.e., the workout data providing the relevant coordinates) are plotted on a graph in space, the DBSCAN clustering algorithm will group together points that are closely packed together within the four-dimensional space (i.e., points with a relevant number of nearby neighbors). As a result, the DBSCAN algorithm marks as outliers points that lie alone or in low-density regions (whose nearest neighbors are too far away or there are an insufficient number of nearby neighbors). If the clustering algorithm is performed on the activity data using the defined parameters for the organized athletic events, a number of clusters will be returned from the clustering algorithm, with each of the clusters identifying an organized athletic event.

It will be recognized that any of various clustering methods and parameters may be used as part of the clustering algorithm. In at least one embodiment, clusters with relatively small numbers of users (e.g., ten to twenty users) may be subjected to more stringent parameters instead of being completely filtered out of the clustering results. For example, if the clustering algorithm returns a cluster with fifteen users, the cluster may only be deemed valid if the minimum distance between starting locations of all members in the cluster is less than ten meters and if all users started within one minute of each other.

Figure 5:
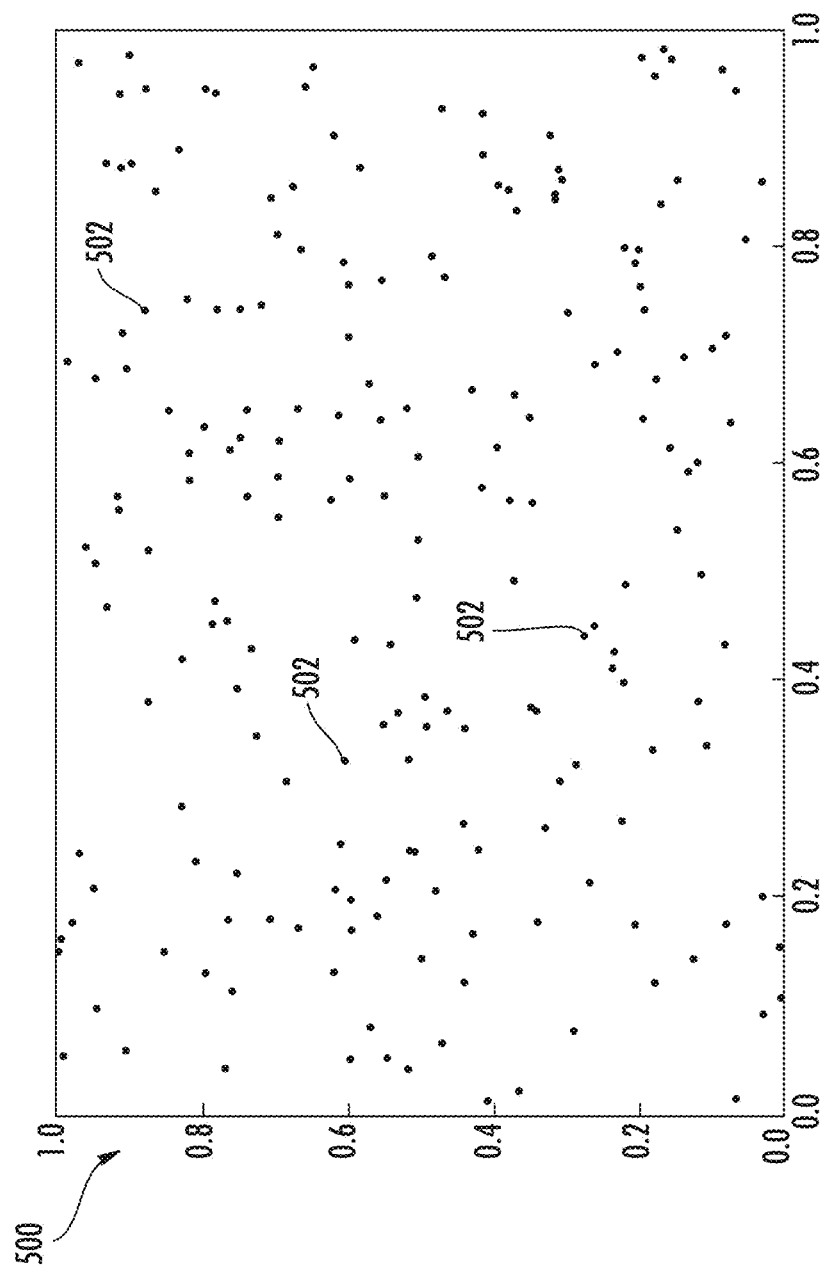
FIG. 5 is an exemplary graph illustrating activity data collected by the activity tracking system plotted on the graph.
Figure 6:
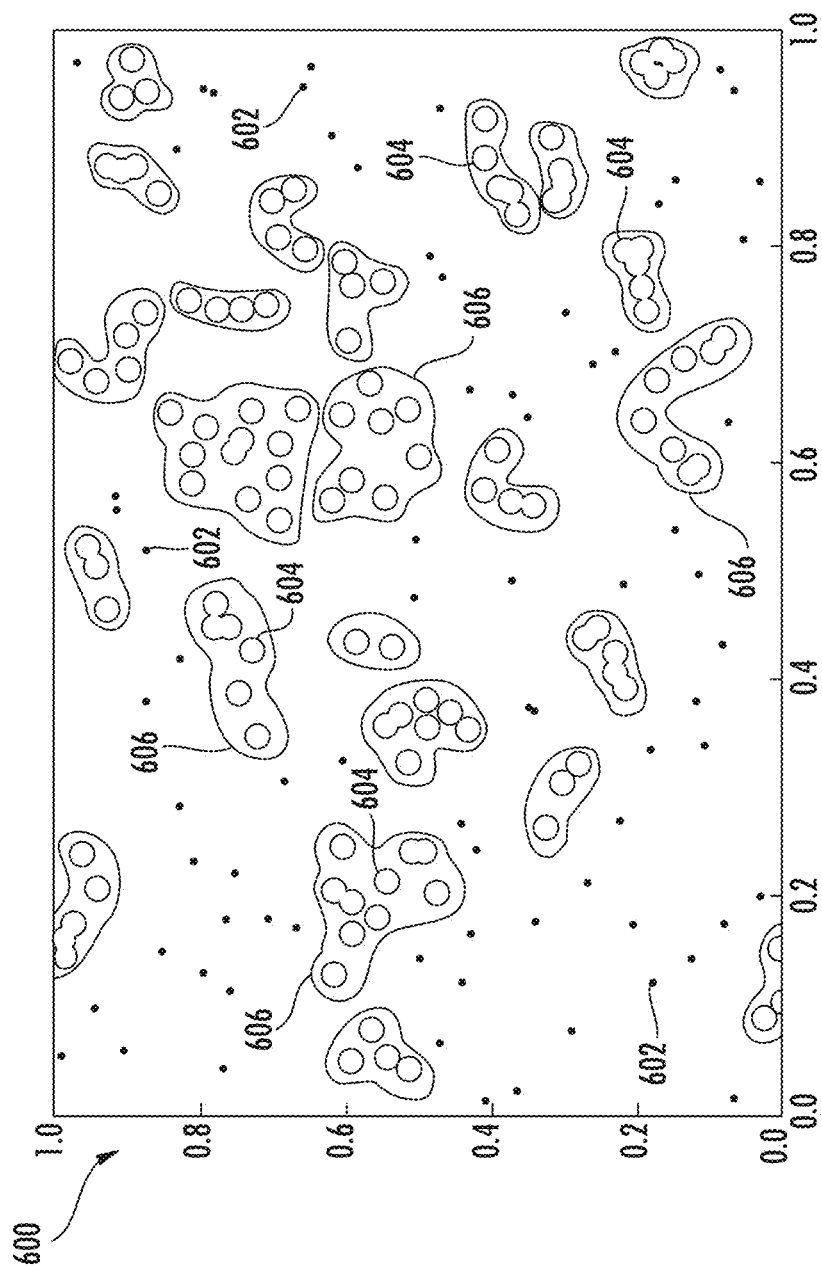
FIG. 6 is an exemplary graph illustrating activity data from the graph of FIG. 5 associated with clusters.

As an example of clustering the activity data using the DBSCAN algorithm, consider the example of FIGS. 5 and 6. As shown in FIG. 5, a graph 500 is provided showing a collection of two hundred points 502 of activity data, each point being a vector of length two (i.e., each point having two coordinates and plotted in two-dimensional space as shown in FIG. 5). The x-axis in FIG. 5 may be considered to represent one of the attributes of the workout (e.g., latitude at start), and the y-axis in FIG. 5 may be considered to represent another of the attributes of the workout (e.g., longitude at start). If the points 502 on the graph of FIG. 5 are clustered using DBSCAN, certain points on the graph can be associated with a cluster of points.

In the graph 600 of FIG. 6, the same points 502 remain on the graph from FIG. 5, but the points 604 that have been associated with a cluster are enlarged. Points 602 on the graph that are outliers which are not associated with a cluster remain smaller. As also shown in FIG. 6, the clustering algorithm identified a several different clusters 606, with each of the individual clusters encircled in FIG. 6 to emphasize the existence of the cluster. Each of the workouts associated with a cluster in the graph of FIG. 6 may then be labeled in the database to identify the cluster with which it is associated.

The example of FIGS. 5 and 6 represents clustering in two-dimensional space for the sake of illustration. However, it will be appreciated that the clustering algorithm will typically be applied in multi-dimensional space with three, four, or even more variables determined to be significant in determining the occurrence of an athletic event. In order to properly identify the existence of a marathon, the four variables discussed above were determined to be useful in identifying a given workout as being part of a marathon. These four variables included start position latitude, start position longitude, start time, and distance traversed. If the DBSCAN algorithm is performed on the workouts with these variables plotted in four-dimensional space and using the identified parameters of proximity of start position, proximity of start time, and distance travelled, clusters of workouts will be identified representing the desired marathon events.

In order to properly identify an organized athletic event, it will be recognized that care must be taken in properly noted that care must be taken in both defining and calculating the parameters. If the parameters for the organized athletic event are not properly defined, the clustering algorithm will return an unacceptable number of (i) false positives (i.e., workouts that were not part of a marathon but were clustered with the marathon participants of a marathon), or (ii) false negatives (i.e., workouts that were part of a marathon, but were not clustered with any particular marathon). False positives may tend to occur if the parameters are too loose such that nearby runners traversing similar distances appear to be part of the organized athletic event. False positives may also tend to occur if individuals fake data in an attempt to make it appear that they participated in an athletic event when indeed they did not (e.g., we want to avoid users riding in a vehicle and attempting to make it appear that they ran a marathon). In this case, false positives may also be avoided using any of a number of data verification schemes (e.g., if a verified signal for a user from a given phone is created it is difficult to fake data so that driving a car does not appear to be the same activity as running). On the other hand, false negatives may tend to occur if the parameters are too tight. Acceptable parameters for properly identify workouts for a marathon or other organized athletic event may be determined by careful consideration of the real-world conditions for the event (e.g., do the runners typically start at the exact same time or in heats) or by trial and error.

Each set of data points identified as a cluster by the DBSCAN algorithm is labeled as a particular marathon by the activity tracking system 200. In at least one embodiment, the labels assigned to each identified marathon are associated with the city in which the marathon started. For example, if a marathon is identified as starting in Baltimore, Md., the marathon may be labeled by date and city, e.g., "May 25, 2015 Baltimore Md. Marathon". As shown in FIG. 2, the data store 240 may include a separate database that stores information on identified marathons. For example, the events database 248 may include information for all of the workouts that were part of the May 2015 Baltimore Md. Marathon. In some instances more than one marathon or other organized athletic event may occur in a single city. In this instance, additional numerals or lettering may be used to identify the separate marathons, e.g., "May 25, 2015 Baltimore Md. Marathon 8:00 am" or "May 25, 2015 Baltimore Md. Marathon 9:00 am".

Translation of Mercator Values

With respect to the four variables identified as being useful toward identification of marathons, it will be noted that both the "start position latitude" variable and the "start position longitude" variable are used to determine a "distance between starting positions" (e.g., if the runners start within 200 meters of each other, it is likely they participated in the same organized athletic event). However, latitude/longitude coordinates merely identify a specific position on the spherical earth, and two different longitude/latitude coordinates alone do not translate into a distance that may be easily calculated in space. One method of determining distance based on two latitude/longitude coordinates is to use Mercator values which are applied to a map. While Mercator values are related to longitude and latitude, it will be noted that the distance between Mercator values varies depending on latitude. For example, runners in Ecuador who are 200 Mercator units away from each other may be the same distance apart as runners in Finland who are more than 400 Mercator units away from each other. Accordingly, when calculating distances between starting points, care must be taken to arrive at the proper distance values based on the latitude/longitude coordinates. Those of ordinary skill in the art will recognized that various algorithms and methods are available for making such distance calculations. Therefore, it will also be recognized that the activity tracking system should include sufficient processing capabilities to calculate distance between workout starting positions based on the starting latitude/longitude variables for the workouts when performing the clustering algorithm.

Example Identification of Organized Athletic Events

In an exemplary operation of the activity tracking system 200, activity data for a twenty-four hour period is collected. The activity data includes over five hundred thousand workouts. The activity data is then cleaned to remove unwanted workouts from the activity data (e.g., workouts with a distance of zero, etc.). A clustering algorithm is then applied to the activity data to cluster the workouts based on a set of defined parameters determined to be relevant for identifying marathon participants. The clustering parameters include the following:

(1) workout starting location: within 200 meters of other workouts; and (2) start time: within 500 seconds of other workouts.

Figure 7:
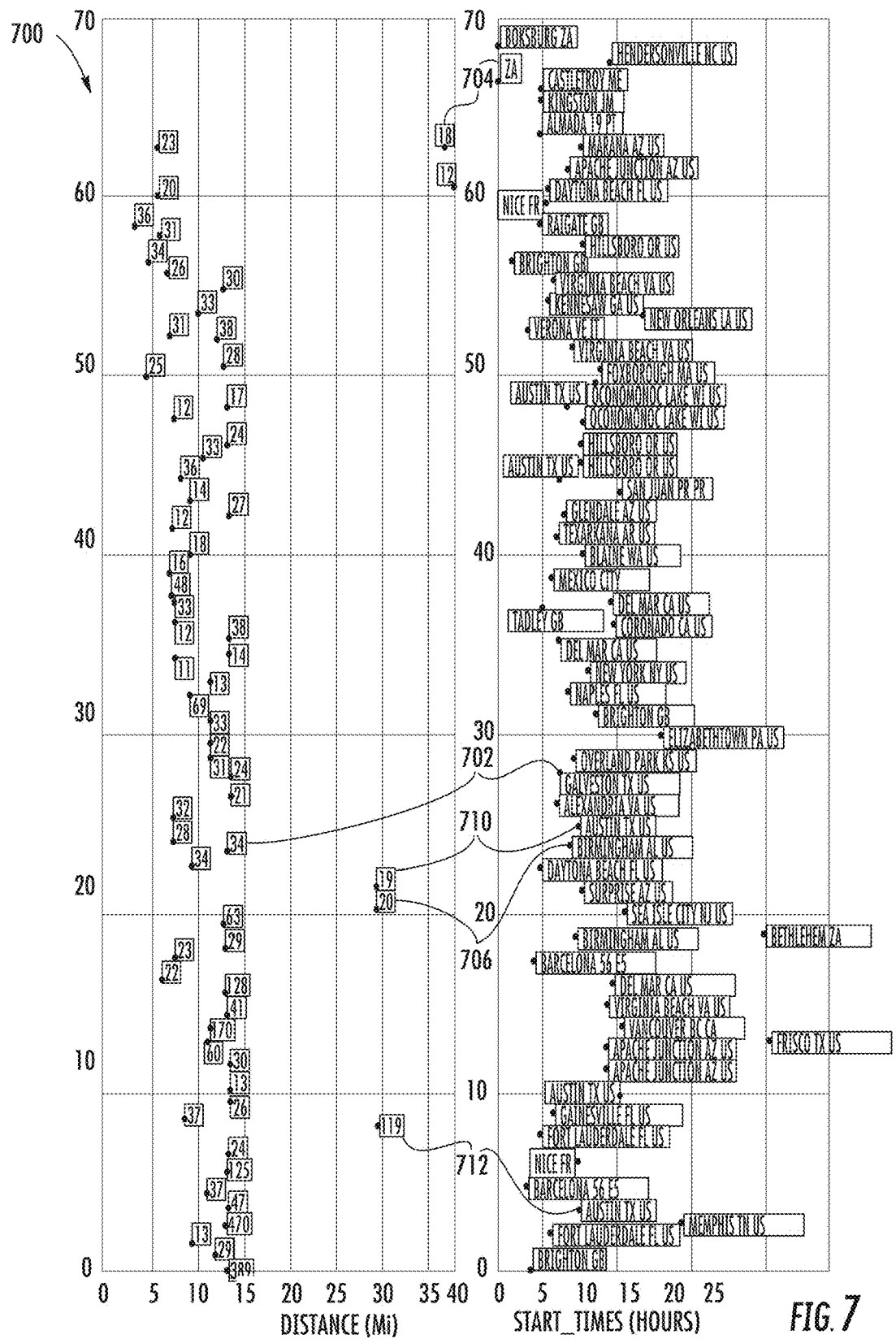
FIG. 7 is an exemplary chart showing organized athletic events identified by the activity tracking system for a particular day.

FIG. 7 shows a table 700 of all of the clustered workouts worldwide for the selected day which meet parameters (1) and (2) above, and at least ten workouts in the cluster. As can be seen from FIG. 7, the workouts likely represent many different organized athletic events of differing lengths in different cities. The lengths of most of the organized athletic events are less than fifteen miles (e.g., see Galveston, Tex. event 702 in FIG. 7). A few of the organized athletic events are greater than 35 miles (e.g., see Boksburg, ZA event 704 in FIG. 7). Only a few of the events include distances that are consistent with marathon distances (e.g., see Birmingham, Ala. event 706 and Austin, Tx. event 710 in FIG. 7).

When a further parameter is added to the clustering algorithm, the activity data of FIG. 7 is limited to only marathon events. In particular, the additional parameter (3) distances travelled between 40 and 47 km (i.e., about 25-29 miles), yields only three clusters for the selected day (as represented in the table 700 of FIG. 7 by the events 706, 710 and 712). A first cluster 706 has a starting location in Birmingham, Ala. and includes 20 participants (i.e., 20 workouts). A second cluster 710 has a starting location in Austin, Tx. and includes 19 participants (i.e., 19 workouts). A third cluster 712 also has a starting location in Austin, Tx. and includes 119 participants (i.e., 119 workouts).

Based on this clustered data shown in tabular form in FIG. 7, it is clear that at least two different marathon events occurred on the selected day. A first marathon occurred in Birmingham, Ala. A second marathon occurred in Austin, Tx. Interestingly, at first review, it appears that two different marathons occurred in Austin, Tx. However, as explained in further detail below, it will be clear that the two clusters of workouts in Austin, Tx. are actually from a single marathon event.

Figure 8:
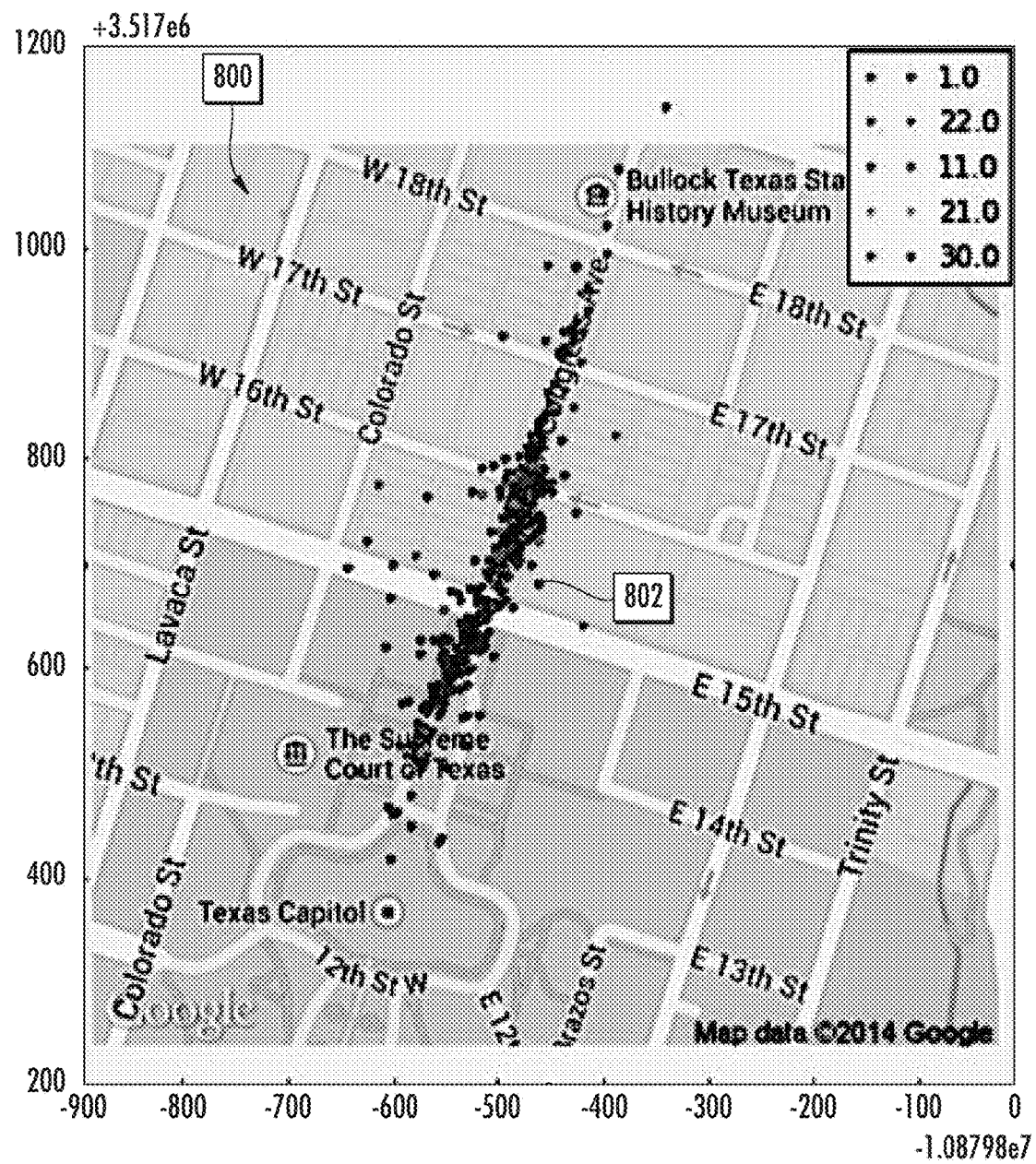
FIG. 8 is an exemplary map of starting points for runners in a marathon identified by the activity tracking system and listed in the chart of FIG. 7.

FIG. 8 shows a map 800 of downtown Austin, Tx. including points 802 representing the starting location of all the Austin, Tx. workouts from the clustered data of FIG. 7 on the map. As expected, all of the workouts are very close to a central starting location for the Austin Marathon, near 15$^{th}$ and N. Congress Ave. The points 802 are near, but not exactly on the starting location for the marathon because each of the different participants activated their GPS-enabled to start the workout at slightly different locations, either prior to the starting line, or just after the starting line.

Refining the Identified Organized Athletic Events

With reference again to FIG. 7, three different marathon events 706, 710 and 712 were identified with workout distances of about 26 miles. Interestingly, two of the three identified marathons occurred in Austin, Tx. (with the other occurring in Birmingham, Ala.). Upon closer inspection, the starting locations of both of the identified marathons 710 and 712 in Austin, Tx. marathons were very close in proximity. However, the starting times of these two identified marathons were about an hour apart. The first identified marathon 710 started at 7 am, while the second identified marathon 712 started at 8 am. However, two different marathon events did not occur in Austin, Tx., each with a different starting time. Instead, many users in a single Austin, Tx. marathon were using GPS-enabled devices that were configured with a time in an incorrect time zone. In particular, the nineteen users in the first event 710 were using devices configured for a more western time zone (i.e., mountain time) than the one hundred nineteen users with their devices arranged in a more eastern time (i.e., central time). As a result, when all of the runners began the marathon at around 8 am central time, nineteen of the runners were logging time that appeared to the activity tracking system to be 7 am mountain time. Accordingly, in these situations, the activity tracking system 200 may be configured to automatically combine several organized athletic events from a single city upon the determination that the identified events were an hour apart and had a sufficient number of similar characteristics (e.g., similar starting locations). However, the activity tracking system 200 will not combine organized athletic events from the same city of there are not a sufficient number of similar characteristics (e.g., if the starting locations are significantly different).

In addition to compensation for time zone issues, the activity tracking system 200 may also be configured to compensate for other timing issues that may be unique to various different organized athletic events. For example, with running events such as marathons, the starting times are often staggered (e.g., staggered start times every ten or fifteen minutes). This is typically done in running events where there are a large number of participants and the start of the race will be slow and cumbersome if there are too many individuals trying to start the race at the same time. In these situations, the activity tracking system is configured to group the workouts with slightly different starting times together as a single athletic event and not identify the workouts with different start times as "extra" marathons in a city.

In order to avoid identifying "extra" marathons, the activity data processing system 236 performs the clustering algorithm a second time. However, when the second clustering algorithm is performed, the clustering is performed on the identified events themselves instead of the individual workout data points. While the second clustering algorithm may use the same clustering method (e.g., DBSCAN), the second clustering algorithm will include different parameters than the first clustering algorithm in order to properly identify which identified events should be clustered together. For example, the second clustering algorithm may be configured with parameters such that events starting within two hundred meters of each other and within an hour of each other should be clustered together. Accordingly, in this embodiment, the activity tracking system 200 essentially clusters the clusters in order to determine whether any of the identified events which are in close proximity to one another should be considered to be a single organized athletic event. This second clustering step, wherein the clusters are clustered, involves clustering based on a second starting time parameter. Although a first starting time parameter was used in the initial clustering step (e.g., starting times within ten or fifteen minutes of each other), the second starting time parameter may be a wider parameter (e.g., starting times within sixty-five minutes of each other). The result of this second clustering step is that the activity tracking system properly identifies a single marathon instead of what appeared to be two different marathons in a city on a given day.

In the foregoing paragraph, the second clustering algorithm was performed for the purpose of avoiding erroneous identification of additional marathons and involved a second start time parameter. However, in other embodiments, the second clustering algorithm may be performed for other reasons and may involve different parameters. For example, in at least one embodiment, an additional clustering algorithm could confirm that two different events originating from a common location on a given day are indeed different events based on the use of a waypoint parameter. For example, if the second clustering algorithm shows that the ½ waypoint (i.e., the latitude/longitude at the ½ distance travelled location) is significantly different for two different groups of marathon participants, this might suggest that the marathon runners took one of two different courses, even though they started from similar locations, and travelled similar distances.

In addition to the above, the waypoint parameter could be used to detect fraud by a participant. For example, consider a 5 K event that follows a particularly hilly course. If a participant decides to cheat by following a different course that is flatter, the activity tracking system would exclude that participant from the organized athletic event if a waypoint parameter is in use. In this case, if the latitude/longitude for the participant at the ½ waypoint was not within the predetermined parameters for other race participants at the ½ waypoint, the activity tracking system would detect that the participant did not follow the designated course, and should be excluded from the race results.

Event Statistics

As discussed herein, the activity tracking system 200 is capable of collecting workout data from across the planet or selected geographic regions for a given day or other period of time. After storing this data and performing the clustering algorithm, the activity tracking system 200 has collected information about any of various organized athletic events in the events database 248. Further processing of the information in this database provides even more information about each of the identified organized athletic events. For example, based on the workouts in each cluster, information may be obtained concerning an approximate start time, length, percentage of male or female participants, average speed, nationality, or other statistics for each of the organized athletic events. These statistics are based only on the participants who were using GPS-enabled devices logged into the activity tracking system 200, and therefore the statistics do not include participants in the event who were not wearing GPS-enabled devices or were not logged into the activity tracking system. As a result, the statistics may be slightly different than the statistics that would be provided for all participants. However, if a significant sample population of the event participants were logged into the system 200 using GPS-enabled devices, the calculated statistics should be reasonably accurate to statistical information retained by the event coordinator (e.g., average speed based on participant transmitters passing the start and finish lines).

The likelihood that event statistics will be accurate relates to in part to statistical behaviors of large populations of people. While a group of two hundred marathon participants may not all be part of the activity tracking system, if a statistically significant number of the participants are part of the activity tracking system, the calculated event statistics should be reasonably accurate.

Because the activity tracking system calculates statistics for each identified event, it is possible to inform individual users of their performance in the event. For example, a message could be sent congratulating a particular user associated with a workout collected from the Austin, Tx. marathon that he or she finished fifth of all users of the activity tracking system; the message could also include a vendor reward or simply congratulate the runner for participating in the marathon (e.g., "Congratulations on participating in the 2015 Austin Marathon—here is your reward coupon"; or "Congratulations! Your time of four hours and five minutes was $5^{th}$ out of 100 MapMyFitness female runners in the 2015 Austin Marathon"). The vendor reward may take any of a number of different forms, such as a gift certificate, coupon, or rewards points for use at a commercial establishment of the vendor or other partner with the activity tracking system 200. Furthermore, messages to users could also provide information such as average speed, average time, average distance, etc. of all users of the activity tracking system that participated in the Austin, Tx. marathon. Additional statistics could also provide information comparing the user to all known marathon participants for the day. For example, a statistic could be calculated concerning the average time for all marathon runners in a given day, and a message may be delivered to a participant in the Austin, Tx. marathon comparing his or her time to all marathon participants for the day worldwide in the activity tracking system.

Depending on the parameters used for the activity tracking system, additional statistics may also be derived. For example, with reference again to FIG. 7, if the clustering algorithm does not limit the distance travelled to a particular distance and instead looks for runners with a common distance traversed (e.g., within 1 km) along with a common start position and a common start time, the clustering algorithm may determine the existence of many organized athletic events in addition to marathon events. For example, as shown in FIG. 7 a number of 5 K, 10 K, half marathon or other distance events may be identified in addition to the marathon events based on the clustering algorithm. Statistics for these organized athletic events may also be derived, similar to the derivation of statistics for the marathon events, as described above. The statistics may include, for example, average speed for 5 K runners worldwide (classified by age or sex, etc.). Also, processing on the user profiles for the participants may be useful in determining what types of athletes run different types of events (e.g., men may tend to run one type of race as opposed to another, men or women of a certain age may tend to run marathons, etc.).

The activity tracking system may also be configured for additional interaction with participants of organized athletic events in addition to providing statistical information. For example, the activity tracking system may provide push visualizations of the organized athletic event to the GPS-enabled devices of the users. Such visualizations may show the route traversed by the user on a map, average times along the route, or interesting landmarks the user passed along the route. Accordingly, it will be appreciated that the activity tracking system 200 is not limited to collection of activity data and identification of organized athletic events, but also includes numerous features and functionality that provide for interaction with the participants in such event.

In at least one embodiment, the activity tracking system 200 is configured to not only identify organized athletic events, but also to automatically identify a course (or course segments) associated with each event. In order to accomplish this, the activity tracking system determines a plurality of waypoints (as discussed above) for each of the participants in an identified event, the plurality of waypoints provided as longitude/latitude coordinates. The plurality of waypoints may include any number of waypoints for each participant (e.g., ten waypoints, one-hundred waypoints, etc.), and such waypoints are typically evenly spread throughout the total distance travelled (e.g., $\frac{1}{10}$, $\frac{2}{10}$, $\frac{3}{10}$, etc.). Thereafter, the waypoints for each of the participants are clustered based on a proximate distance parameter for the waypoints (e.g., each $\frac{1}{10}$ within 200 meters of other $\frac{1}{10}$ waypoints). When the waypoints are clustered in this manner, most of the waypoints will be core points within the cluster, some of the waypoints may be non-core points within the cluster, and other waypoints may be identified as noise points outside of the cluster. After the clustering algorithm, each cluster of waypoints is associated with a longitude/latitude coordinate, and this coordinate is identified as part of the route for the event. In this manner, an approximate course for the event can be identified based on the waypoints. In at least one embodiment, the course may be reduced to a series of edges and nodes that define the course, as described in U.S. patent application Ser. No. 14/658,935, filed Mar. 16, 2015, the content of which is incorporated herein by reference in its entirety.

As an example of the above, consider a marathon where the activity tracking system 200 is configured to determine one-hundred waypoints for each participant in the marathon. By plotting the waypoints for each participant, and clustering the waypoints based on a distance parameter, one hundred clusters of waypoints for the route may be expected. If these coordinates are then associated with a map, the route of the marathon may be easily identified. Accordingly, the activity tracking system may be configured to not only identify the existence of an event and calculate statistics for the event, but may also be configured to determine the course covered by the event. It will be recognized that determination of the course is not by collecting GPS data from known participants in the event, but instead is collected by first collecting activity data for users across a region, identifying the existence of an organized athletic event and which of those users participated in the event, and only then determining the course associated with the identified event.

The statistics, routes and other information collected by the activity tracking system 200 may also be useful for other entities other than participants in the identified events. For example, governing bodies exist for many types of organized athletic events, and these governing bodies collect data on events from the event coordinator. However in many situations the data collected by the governing bodies from the event organizer is incomplete or lacking in some respect. The data collected by the activity tracking system 200 reaches across all organizations, jurisdictions, countries, etc. Unlike an event coordinator who is collecting data on a given day for only one event (or at most, a few events), the activity tracking system 200 described herein is able to collect data on various event types worldwide.

In addition to collecting data from users of the activity tracking system 200 who randomly participate in various events worldwide, it will also be appreciated that the activity tracking system will allow small groups of individuals to conduct their own organized athletic events. Thus, if a user is associated with a group where everyone in the group is a registered user of the activity tracking system 200, those registered users can easily track their common workouts and view their performance relative to one another. For example, an given company or club may conduct their own competition by requiring the employees or member participants to register their GPS-enabled device 210 with the activity tracking system 200, and then simply show up for the competition at the allotted time and location with their GPS-enabled device 210. As long as the group has a minimum number of participants, the activity tracking system 200 will recognize the event and record the appropriate statistics. In at least one embodiment, the organizers of a smaller event may provide prior notice to the activity tracking system that the event will occur at a given time and location, and the clustering parameters may be relaxed for this particular city or other location, thus allowing the activity tracking system 200 to recognize the event even if the event has less than the required number of participants for normal recognition as an organized athletic event.

In addition to identifying organized athletic events and collecting statistical information concerning participants in such events, the activity tracking system may also be used for advertising or related communications with the event participants. For example, if an individual is the fastest participant recorded by the activity tracking system 200 in a particular 5 K run, a reward may be given to that participant. An example reward may be a gift certificate or a reward coupon for a sporting goods store or healthy restaurant near the location of the event (e.g., a $50 gift certificate for use towards a pair of running shoes). Additionally, rewards need not be limited to the best times or showings for an event. Rewards may be based on participation or may be dependent upon the user (e.g., for lower activity users, rewards may be designed to encourage the user to participate in another event).

In at least one embodiment, the activity tracking system 200 may be configured to send statistical information and reward messages to any participant in an organized athletic event or only to selected participants. Accordingly, the activity tracking system 200 may be configured to only send statistical information and rewards to users who participated in events within a predetermined distance of a sponsor's commercial establishment (e.g., rewards messages sent only to participants of events within 50 miles of a Dick's Sporting Goods or only to participants with a registered address within 50 miles of a Dick's Sporting Goods). In this embodiment, the activity tracking system 200 may be configured to essentially ignore participants of events that occur outside of a targeted sponsor range. Accordingly, such participants may not be informed that the activity tracking system identified them as part of an organized athletic event.

The foregoing detailed description of one or more exemplary embodiments of the activity tracking system and method for determining the occurrence of organized athletic events has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A method of identifying occurrence of one or more organized athletic events, each of the organized athletic events having a plurality of participants travelling at different paces, the method comprising:
receiving athletic activity data for the participants from a plurality of activity monitoring devices carried by the participants, the athletic activity data defining workouts performed by the participants wherein the participants each travel at a different pace during their respective workouts;
defining a plurality of parameters for the athletic activity data, the parameters defining common athletic activity data for the participants of each of the organized athletic events;
clustering the athletic activity data into one or more clusters of workouts based on the defined parameters for the athletic activity data;
identifying the one or more organized athletic events based on the one or more clusters of workouts;
identifying the participants of at least one of the one or more athletic events; and
transmitting a message to the identified participants.

2. The method of claim 1 wherein the received athletic activity data includes at least one of distance data, start location data, end location data, and start time data for each of the workouts, wherein each of the organized athletic events is defined by a set of rules for the participants of said organized athletic event, wherein the set of rules is defined prior to occurrence of said organized athletic event, and wherein the parameters defining common athletic activity data for the participants of each of the organized athletic events are based on at least a subset of the rules defined prior to the occurrence of said organized athletic event.

3. The method of claim 2 wherein the plurality of parameters for the athletic activity data include at least one of a distance range, proximity of start location, proximity of end location, and proximity of start time, and wherein identifying the participants of at least one of the one or more organized athletic events occurs after identifying the one or more athletic events.

4. The method of claim 1 further comprising identifying the participants of each of the one or more organized athletic events based on the clusters of workouts.

5. The method of claim 1 further comprising clustering the clusters of workouts based on an additional clustering parameter.

6. The method of claim 5 wherein the additional clustering parameter is a time parameter configured to remove duplicate identification of the one or more organized athletic events.

7. The method of claim 5 wherein the additional clustering parameter is a waypoint parameter configured to identify a route associated with the one or organized athletic events.

8. The method of claim 1 further comprising filtering the one or more organized athletic events to identify one or more relevant organized athletic events within a predetermined distance from a vendor.

9. The method of claim 1 further comprising generating individual statistics for one of the participants of the one or more organized athletic events and sending those individual statistics to the one of the participants.

10. The method of claim 1 further comprising sending a message to the participants along with a vendor reward.

11. An arrangement for identifying occurrence of one or more organized athletic events, each of the organized athletic events having a plurality of participants travelling at different paces, the arrangement comprising:
a plurality geo-position devices configured to be carried by the participants, each of the geo-position devices including at least one sensor configured to obtain athletic activity data for the participant, the athletic activity data defining a workout for the participant during the one of the organized athletic event, said workout defined by a pace that is different from paces of other participants during the organized athletic event;
a database configured to store the athletic activity data; and
an activity data processing system configured to (i) cluster the athletic activity data into one or more clusters of workouts based on parameters for the athletic activity data, the parameters defining common athletic activity data for the participants, and (ii) identify the one or more clusters of workouts as indicating existence of the one or more organized athletic events.

12. The arrangement of claim 11, wherein the athletic activity data includes one or more of distance data, start location data, end location data, and start time data for each of the workouts, wherein each of the organized athletic events is defined by a set of rules for the participants of said organized athletic event, wherein the set of rules is defined prior to occurrence of said organized athletic event, and wherein the parameters defining common athletic activity data for the participants are based on at least a subset of the rules defined prior to the occurrence of said organized athletic event.

13. The arrangement of claim 12 wherein the parameters for the athletic activity data include a distance range, proximity of start location, proximity of end location, and proximity of start time.

14. The arrangement of claim 11 wherein the activity data processing system is further configured to identify the participants of the one or more organized athletic events based on the one or more clusters of workouts, filter the organized athletic events to identify one or more relevant organized athletic events, and send the participants associated with the filtered organized athletic events a message.

15. The arrangement of claim 11 wherein the activity data processing system is further configured to cluster the clusters of workouts in order to remove duplicate identification for the one or more organized athletic events or to identify a route associated with the one or organized athletic events.

16. A non-transient computer readable medium containing instructions for identifying an organized athletic event including a plurality of participants travelling at different paces by:
receiving athletic activity data for the participants from a plurality of activity monitoring devices carried by the participants, the athletic activity data defining workouts performed by the participants, the athletic activity data including pace data that for each of the plurality of participants that indicates that the participants are travelling at different paces;
clustering the athletic activity data into one or more clusters of workouts based on parameters for the athletic activity data, the parameters defining common athletic activity data for the participants;

identifying one of the one or more clusters of workouts as indicating the existence of the organized athletic event; and sending a message to the participants of the organized athletic event.

17. The computer readable medium of claim 16, wherein the athletic activity data further includes distance data, start location data, end location data, and start time data for each of the workouts, wherein the organized athletic event is defined by a set of rules for the participants of the organized athletic event, wherein the set of rules is defined prior to occurrence of the organized athletic event, and wherein the parameters defining common athletic activity data for the participants are based on at least a subset of the rules defined prior to the occurrence of the organized athletic event.

18. The computer readable medium of claim 17 wherein the parameters for the athletic activity data include a distance range, proximity of start location, proximity of end location, and proximity of start time.

19. The computer readable medium of claim 16 further containing instructions for filtering the clusters of workouts based on a predetermined distance from a predetermined location and, after the filtering, identifying the participants of the organized athletic event.

20. The computer readable medium of claim 16 further comprising clustering the clusters of workouts in order to remove duplicate identification for the organized athletic event or to identify a route associated with the one or organized athletic events.

\* \* \* \* \*